(12) United States Patent
Fujioka et al.

(10) Patent No.: US 8,221,512 B2
(45) Date of Patent: Jul. 17, 2012

(54) HYDROGEN GENERATOR AND FUEL CELL SYSTEM

(75) Inventors: Hiroki Fujioka, Osaka (JP); Akira Maenishi, Osaka (JP); Yoshio Tamura, Nara (JP); Yuji Mukai, Osaka (JP); Kiyoshi Taguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 1074 days.

(21) Appl. No.: 12/064,304

(22) PCT Filed: Sep. 28, 2006

(86) PCT No.: PCT/JP2006/319346
§ 371 (c)(1),
(2), (4) Date: Feb. 20, 2008

(87) PCT Pub. No.: WO2007/040146
PCT Pub. Date: Apr. 12, 2007

(65) Prior Publication Data
US 2009/0258263 A1    Oct. 15, 2009

(30) Foreign Application Priority Data

Sep. 30, 2005    (JP) ................................. 2005-285853

(51) Int. Cl.
*H01M 8/18*    (2006.01)
*B01J 8/00*    (2006.01)

(52) U.S. Cl. ............................ 48/127.9; 429/416; 48/61
(58) Field of Classification Search ........... 48/61–118.5, 48/127.9; 422/129–242; 429/400–535
See application file for complete search history.

(56) References Cited

U.S. PATENT DOCUMENTS 6,613,940 B1    9/2003    Nishimura et al.
(Continued)

FOREIGN PATENT DOCUMENTS

JP    1-320201    12/1989
(Continued)

OTHER PUBLICATIONS

Translation of JP 03-265502.*
(Continued)

*Primary Examiner* — Imran Akram
(74) *Attorney, Agent, or Firm* — McDermott Will & Emery LLP

(57) ABSTRACT

Provided is a hydrogen generator capable of suppressing degradation in capability of a hydrogen generator which is caused by crush of particulate reforming catalyst and of suppressing decrease in reforming efficiency due to decrease in heat transfer efficiency of a catalyzing portion which is caused by the crush of the particulate reforming catalyst. A hydrogen generator comprises a catalyzing portion 50 having particulate reforming catalyst P, and a combusting portion 5 for heating the catalyzing portion 50, the hydrogen generator being configured to generate a reformed gas containing hydrogen while flowing a material gas containing steam in a direction in which the catalyzing portion 50 extends. The catalyzing portion 50 includes a separating member 40. The separating member 40 is disposed on a separating cross-section which is a cross-section of the catalyzing portion 50 in a direction perpendicular to the direction in which the catalyzing portion 50 extends. A plurality of air holes 40D having a shape to inhibit passage of the particulate reforming catalyst P are provided on the separating member 40. An opening having a shape to permit passage of the particulate reforming catalyst P is provided on the separating cross-section.

6 Claims, 7 Drawing Sheets

U.S. PATENT DOCUMENTS

| | | |
|---|---|---|
| 2004/0185312 A1* | 9/2004 | Irons et al. .................. 429/17 |
| 2005/0148793 A1 | 7/2005 | Yada et al. |
| 2006/0248800 A1* | 11/2006 | Miglin et al. ............. 48/198.7 |
| 2009/0087705 A1 | 4/2009 | Fuju et al. |

FOREIGN PATENT DOCUMENTS

| | | |
|---|---|---|
| JP | 3-265502 | 11/1991 |
| JP | 8-208202 | 8/1996 |
| JP | 2000-026104 | 1/2000 |
| JP | 2001-139499 | 5/2001 |
| JP | 2003-151607 | 5/2003 |
| JP | 2004-083430 | 3/2004 |
| JP | 2005-337042 | 12/2005 |
| JP | 2009-007204 | 1/2009 |
| JP | 2009-084079 | 4/2009 |
| WO | WO 2004022480 A2 * | 3/2004 |

OTHER PUBLICATIONS

Japanese Office Action issued in Japanese Application No. 2007-538733 dated Apr. 17, 2012.

* cited by examiner

US 8,221,512 B2

HYDROGEN GENERATOR AND FUEL CELL SYSTEM

RELATED APPLICATIONS

This application is the U.S. National Phase under 35 U.S.C. §371 of International Application No. PCT/JP2006/319346, filed on Sep. 28, 2006, which in turn claims the benefit of Japanese Application No. 2005-285853, filed on Sep. 30, 2005, the disclosures of which Applications are incorporated by reference herein.

TECHNICAL FIELD

The present invention relates to a hydrogen generator for generating a reformed gas composed mainly of hydrogen by reforming a material which is a hydrocarbon compound such as a natural gas, LPG, gasoline, naphtha, kerosene, or methanol by using steam, and to a fuel cell system comprising the hydrogen generator.

BACKGROUND ART

Hydrogen generators have been known, in which a reformed gas composed mainly of hydrogen is generated in such a manner that a material containing an organic compound composed of at least carbon and hydrogen is passed, in the form of a steam-containing material gas, through a catalyzing portion filled up with a particulate reforming catalyst whereby the material gas is subjected to steam reforming. This type of hydrogen generator is suitable for use in fuel cell systems. In the fuel cell systems, the reformed gas is typically subjected to reduction in concentration of carbon monoxide in a shift converter and in a carbon monoxide selective oxidization device, and is then supplied to a fuel cell.

A conventional hydrogen generator has a reformer body which includes the above described catalyzing portion. The reformer body is supplied with a material, water, and a fuel for combustion, combusts the fuel for combustion therein, and discharges a combustion gas and a reformed gas. To be specific, within the reformer body, vaporization of water or water and material and steam reforming reaction proceed, by utilizing combustion heat. During startup operation and shutdown operation of the hydrogen generator, the combustion heat causes thermal deformation within the reformer body. The catalyst in the catalyzing portion is partially crushed by application of pressure resulting from the thermal deformation, thereby causing a flow passage of a reforming reaction gas in the catalyzing portion to be somewhat clogged. This arises a problem that capability of the hydrogen generator degrades. In view of this problem, patent document 1 discloses a structure of a fuel reformer aimed at reducing crush of the particulate reforming catalyst due to the thermal deformation of a reforming pipe. As used herein, the term "reforming reaction gas" refers to steam-containing material gases which are generated by vaporization of water and a material and reformed gases, and that flow through the catalyzing portion.

FIG. 11 is a longitudinal sectional view of the fuel reformer disclosed in embodiment 3 of the patent document 1.

As shown in the FIG. 11, at a burner 105 in a reformer body 100, a fuel introduced from a fuel inlet 153 is combusted by combustion air taken in from an air inlet 154 and thereby a high-temperature heat medium 151 which is a combustion gas is generated. The heat medium 151 flows downward along an inner peripheral surface of an inner tubular body 182 of a reforming pipe 108. Following this, while flowing within a heat medium passage 152, the heat medium 151 flows upward along an outer peripheral surface of an outer tubular body 183, and thereafter is discharged to outside the reformer body 100 from a heat medium outlet 171. During this, the heat medium 151 heats a catalyst layer 103 mainly from the inner peripheral surface side of the inner tubular body 182 of the reforming pipe 108, and also heats a material gas 109 flowing within an outer tubular space 187 from the outer peripheral surface side of the outer tubular body 183.

At this time, a particulate reforming catalyst P present in the catalyst layer 103 is supplied and heated with heat that is transferred from the heat medium 151 via the inner tubular body 182. Thereby, in the reformer body 100, the catalyst layer 103 is sufficiently heated. Meanwhile, the water-containing material 109 flows into the reformer body 100 from an inlet 871, first flows downward within the outer tubular space 187, then flows back in the opposite direction at a lower end of an intermediate tubular body 181, enters the catalyst layer 103, and flows upward within the catalyst layer 103. During this, the material 109 is heated mainly in the outer tubular space 187 by the heat medium 151. The water and the material 109 heated by the heat medium 151 is vaporized into a material gas containing steam and is reformed into a hydrogen-rich reformed gas 110 by catalytic reforming action exhibited by the particulate reforming catalyst P which has been heated by the heat medium 151 to a required temperature. The reformed gas 110 thus obtained is supplied to outside the reformer body 100 from an outlet 861. Note that the water or the material 109 flowing into the reformer body 100 from the inlet 871 may be either in the form of steam or gas.

The catalyst layer 103 of the reformer body 100 is disposed in an inner tubular space 186 formed within the reforming pipe 108, and includes a plurality of respective catalyst layers 131 and a plurality of separating plates 132. Each separating plate 132 is a annular metal plate, has an outer diameter dimension that defines, between itself and the intermediate tubular body 181, a gap having a dimension smaller than a outside dimension of the particulate reforming catalyst P, and is firmly fixed, at its inner peripheral surface, to an outer peripheral surface of the inner tubular body 182 by welding or other means. A number of through holes having a smaller diameter than the outside dimension of the particulate reforming catalyst P are formed on the separating plate 132. The plurality of separating plates 132 of the catalyst layer 103 are arranged in such a manner that adjacent separating plates 132 are spaced apart from each other at equal intervals along a direction of a center axis X of the inner tubular space 186.

Each catalyst layer 131, whose lower surface is defined by its associated separating plate 132, is formed by filling with the particulate reforming catalyst P inside the inner tubular space 186 having the periphery defined by the intermediate and inner tubular bodies 181 and 182. Each catalyst layer 131 is formed such that a space 311 is defined between its upper surface and an adjacently overlying separating plate 132. Note that filling the catalyst layers 131 except for an uppermost catalyst layer 131 with the particulate reforming catalyst P is carried out from a through hole 811 formed in the intermediate tubular body 181 so as to have a greater diameter than the outside dimension of the particulate reforming catalyst P, in a state where at least an upper plate 185 or an outer tubular body 183 is not mounted to the reforming pipe 8. After completion of filling with the particulate reforming catalyst P, the through hole 811 is air-tightly closed by a closing plate 812. Filling the uppermost catalyst layer 131 with the particulate reforming catalyst P is carried out after connection of the intermediate tubular body 181, the inner tubular body 182, and the outer tubular body 183 by a closing plate 184 or the like.

Thereby, the space 311 is formed above an upper surface of an upper layer portion of each catalyst layer 131 and is not filled with the particulate reforming catalyst P. For this reason, the particulate reforming catalyst P present in the vicinity of the upper surface of the each catalyst layer 131 is allowed to move upward almost freely and is subjected to only a slight force caused by friction or the like. Thus, it is proposed that the level of force applied to the particulate reforming catalyst P can be reduced in contrast to the catalyst layer of a conventional fuel reformer.

Patent document 1: Japanese Laid-Open Patent Application Publication No. Hei. 8-208202

DISCLOSURE OF THE INVENTION

Problems to be Solved by the Invention

However, even the structure of the catalyzing portion which is divided into respective catalyst layers by the separating plates as proposed in the above described patent document 1, suffers from crush, and broken pieces of the crushed particulate reforming catalyst are accumulated downstream in a direction in which the catalyzing portion extends (hereinafter, referred to just as "downstream side"), i.e., in the vicinities of the separating plates. Therefore, the problem that the reforming reaction gas flow passage is clogged with the accumulated broken pieces of the crushed particulate reforming catalyst, and that the capability of the hydrogen generator decreases still remains unsolved.

Besides, in the structure of the catalyzing portion divided by separating plates as proposed in the patent document 1, the catalyzing portion is divided into a plurality of respective catalyst layers. And, in a gap between adjacent respective catalyst layers, heat applied to the catalyzing portion is not utilized to heat the catalyst, but is released to its surrounding area. This arises the problem that the efficiency of heat transfer in the catalyzing portion decreases as compared to a conventional catalyzing portion. Especially, the gap between adjacent respective catalyst layers expands if the particulate reforming catalyst is crushed, which produces another problem that the efficiency of heat transfer in the catalyzing portion further decreases, leading to the result that the efficiency of reforming decreases. In this case, it is required that the amount of heat of the burner be increased because of the decrease in the efficiency of heat transfer, and the catalyst layer in the vicinity of the burner is elevated in temperature, leading to the possibility that the life of the particulate reforming catalyst reduces. Furthermore, since the catalyst layer in the vicinity of the burner is elevated in temperature, the reforming reaction balance becomes uneven and concentrates on the product side, so that the concentration of carbon monoxide present in the reformed gas increases. There may in some cases arises the problems of shutdown of the fuel cell system.

With a view to providing solutions to the above-described problems, the present invention was made. Accordingly, an object of the present invention is to provide a hydrogen generator capable of suppressing degradation in capability of a hydrogen generator which is caused by crush of particulate reforming catalyst, and of suppressing decrease in reforming efficiency due to decease in heat transfer efficiency in a catalyzing portion which is caused by the crush of the particulate reforming catalyst.

Means for Solving the Problem

To achieve the above described object, a hydrogen generator of a first invention comprises a catalyzing portion having particulate reforming catalyst; and a combusting portion for heating the catalyzing portion, the hydrogen generator being configured to generate a reformed gas containing hydrogen while flowing a material gas containing steam in a direction in which the catalyzing portion extends; wherein the catalyzing portion includes a separating member; the separating member is disposed on a separating cross-section which is a cross-section of the catalyzing portion in a direction perpendicular to the direction in which the catalyzing portion extends; wherein a plurality of air holes having a shape to inhibit passage of the particulate reforming catalyst are provided on the separating member; and wherein an opening having a shape to permit passage of the particulate reforming catalyst is provided on the separating cross-section. In such a configuration, in the catalyzing portion of the present invention, neither clogging of the reforming reaction gas flow passage nor generation of voids of the particulate reforming catalyst is caused by the crush of the particulate reforming catalyst in the catalyzing portion. As a result, it becomes possible to suppress the degradation in capability of the hydrogen generator which is caused by the crush of the particulate reforming catalyst and the decrease in reforming efficiency due to the decrease in heat transfer efficiency in the catalyzing portion which is caused by the crush of the particulate reforming catalyst.

The hydrogen generator of a second invention may be such that a plurality of separating members are arranged in parallel in the direction in which the catalyzing portion extends; and the plurality of separating members are disposed in such a manner that openings provided on adjacent separating cross-sections do not overlap each other as viewed from the direction in which the catalyzing portion extends. In such a configuration, in the catalyzing portion of the present invention, flow passages for the reforming reaction gas can be made dispersed in the catalyzing portion and therefore a catalytic reaction distribution and a temperature distribution within the catalyzing portion become uniform. As a result, the catalyzing portion is able to exhibit high performance.

The hydrogen generator of a third invention may be such that a plurality of separating members are arranged in parallel in the direction in which the catalyzing portion extends, and the plurality of separating members are disposed in such a manner that openings provided on adjacent separating cross-sections form an angle of approximately 180 degrees as viewed from the direction in which the catalyzing portion extends. In such a configuration, the flowing distance of the reforming reaction gas in the direction substantially perpendicular to the direction in which the catalyzing portion extends, between the adjacent separating members, can be maximized. As a result, the catalyzing portion is able to exhibit higher performance.

The hydrogen generator of a fourth invention may be such that a temperature detector is provided on downstream side of an opening on most-downstream side in a flow of a gas flowing in the direction in which the catalyzing portion extends. In such a configuration, the temperature of the catalyzing portion can be accurately measured.

The hydrogen generator of a fifth invention may be such that the temperature detector is disposed to overlap the opening on most-downstream side as viewed from the direction in which the catalyzing portion extends. In such a configuration, the temperature of the gas made uniform in the opening can be accurately detected, and thus a suitable temperature can be detected as the representative temperature of the catalyzing portion.

The hydrogen generator of a sixth embodiment may comprise double tubes, and at least a part of the catalyzing portion may be formed in a space between the double tubes, and the separating member may be disposed in the space between the double tubes in such a manner that the separating member is joined to an outer peripheral surface of an inner tube of the double tubes, and the combusting portion may be configured to heat the inner tube from inner side of the inner tube. In such a configuration, since heat is transferred from the inner tube to the separating member, heating of the particulate reforming catalyst can be facilitated.

The hydrogen generator of a seventh invention may be such that the separating member is substantially C-shaped in a plan view to have an inner peripheral edge and an outer peripheral edge and to have an arcuate gap, and the opening is formed in the gap. In such a configuration, a structure of the separating member can be simplified, and an operation for joining the separating member to the inner tube can be easily carried out.

A fuel cell system of an eighth invention comprises the hydrogen generator according to any one of the first to sixth inventions; and a fuel cell which is supplied with the reformed gas as a material from the hydrogen generator. In such a configuration, in the catalyzing portion of the present invention, neither clogging of the reforming reaction gas flow passage nor generation of voids of the particulate reforming catalyst is caused by the crush of the particulate reforming catalyst in the catalyzing portion. As a result, it becomes possible to suppress the degradation in capability of the fuel cell system which is caused by the crush of the particulate reforming catalyst and the decrease in reforming efficiency due to the decrease in heat transfer efficiency in the catalyzing portion which is caused by the crush of the particulate reforming catalyst.

The above and further objects, features and advantages of the invention will more fully be apparent from the following detailed description of the preferred embodiments with accompanying drawings.

Effects of the Invention

As should be appreciated from the above, a hydrogen generator is effectively capable of suppressing degradation in capability of a hydrogen generator which is caused by crush of particulate reforming catalyst and the decrease in reforming efficiency due to decrease in heat transfer efficiency of a catalyzing portion which is caused by crush of particulate reforming catalyst.

DESCRIPTION OF REFERENCE NUMERALS

Figure 1:
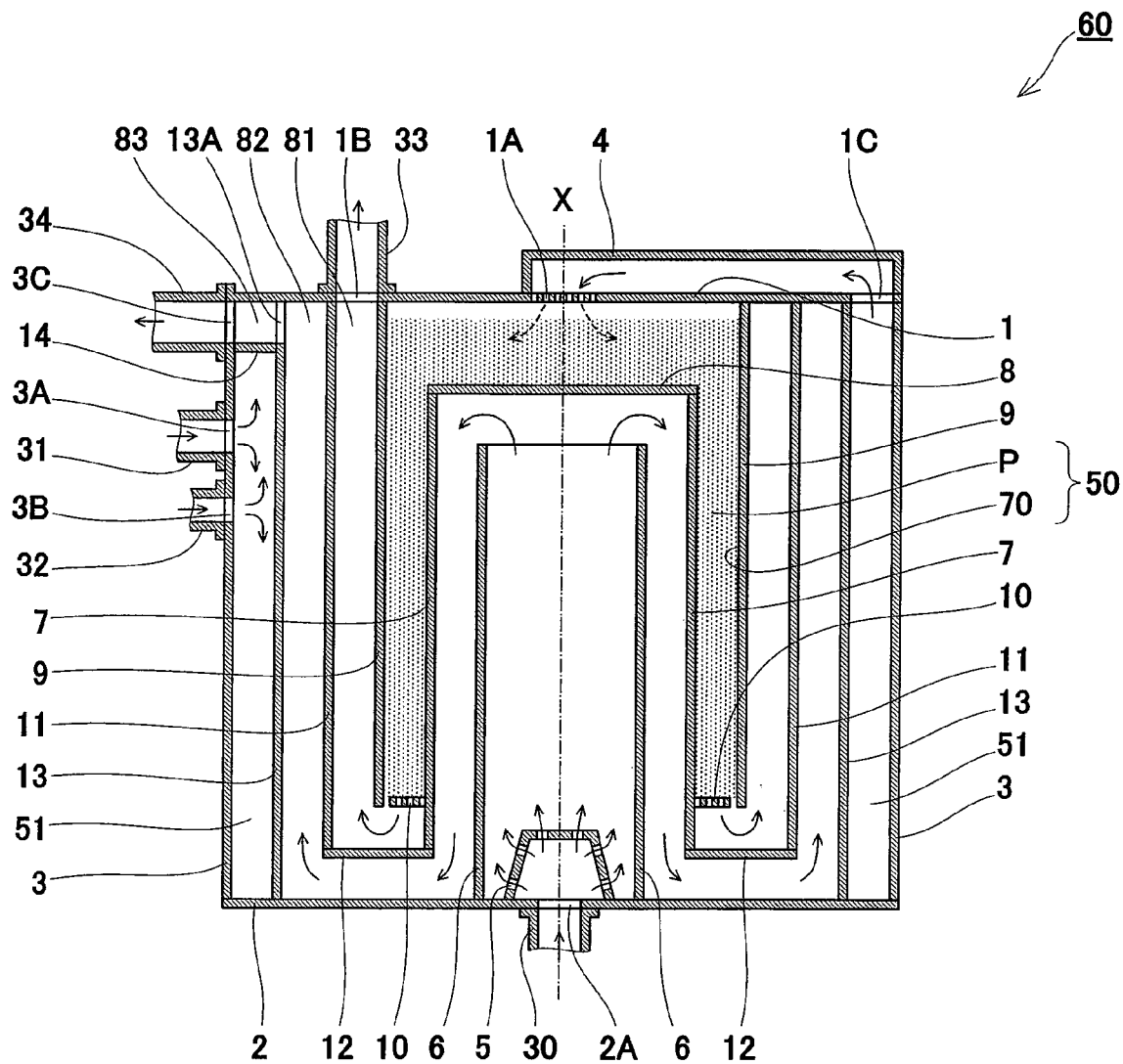
FIG. 1 is a longitudinal sectional view that schematically shows one example of an inner structure of a reformer body of a hydrogen generator according to an embodiment of the invention.

1: first outer lid
1A: catalyzing portion inlet hole
1B: reformed gas discharge hole
1C: preheating portion outlet hole
2: second outer lid
2A: combustion fuel supply hole
3: outer tube
3A: material feed hole
3B: water supply hole
3C: second combustion gas discharge hole
4: connecting member
5: combustor
6: radiation member
7: catalyzing portion inner tube
8: catalyzing portion inner tube lid
9: catalyzing portion outer tube
10: catalyzing portion outer tube lid
10A: concave portion
10B: catalyst filling hole
10C: closing plate
11: reformed gas separating tube
12: reformed gas separating lid
13: preheating portion inner tube
13A: first combustion gas discharge hole
14: connecting member
30, 31, 32, 33, 34: pipe member
40, 40U, 40V, 40W: separating member
40A, 49A: outer peripheral edge
40B, 49B: inner peripheral edge
40C, 45C: end
40D, 45D, 48D, 49D: air hole
43, 43U, 43V, 43W: opening
45, 45U, 45V, 45W: separating member
46, 46U, 46V, 46W: opening
48: separating member
48C: through hole
49: separating member
50: catalyzing portion
51: preheating portion
52: opening
60, 100: reformer body
70: catalyst accommodating space
70A: tubular space
80: gap
81: reformed gas passage
82: second combustion gas passage
83: third combustion gas passage
103: catalyst layer
105: burner
108: reforming pipe
109: material 110: reformed gas
131: respective catalyst layers
132: separating plate
151: heat medium
152: heat medium passage
153: fuel inlet
154: air inlet
171: heat medium outlet
181: intermediate tubular body
182: inner tubular body
183: outer tubular body
184: closing plate
185: upper plate
186: inner tubular space
187: outer tubular space
311: space
811: through hole
812: closing plate
861: outlet
871: inlet
G: gap
P: particulate reforming catalyst
P θ 0: reference angle position
P θ U, P θ V, P θ W: angle position
T: temperature detector
θ: center angle

BEST MODE FOR CARRYING OUT THE INVENTION

Referring now to the accompanying drawings, the best mode for carrying out the invention will be hereinafter described.

Embodiment

Figure 2:
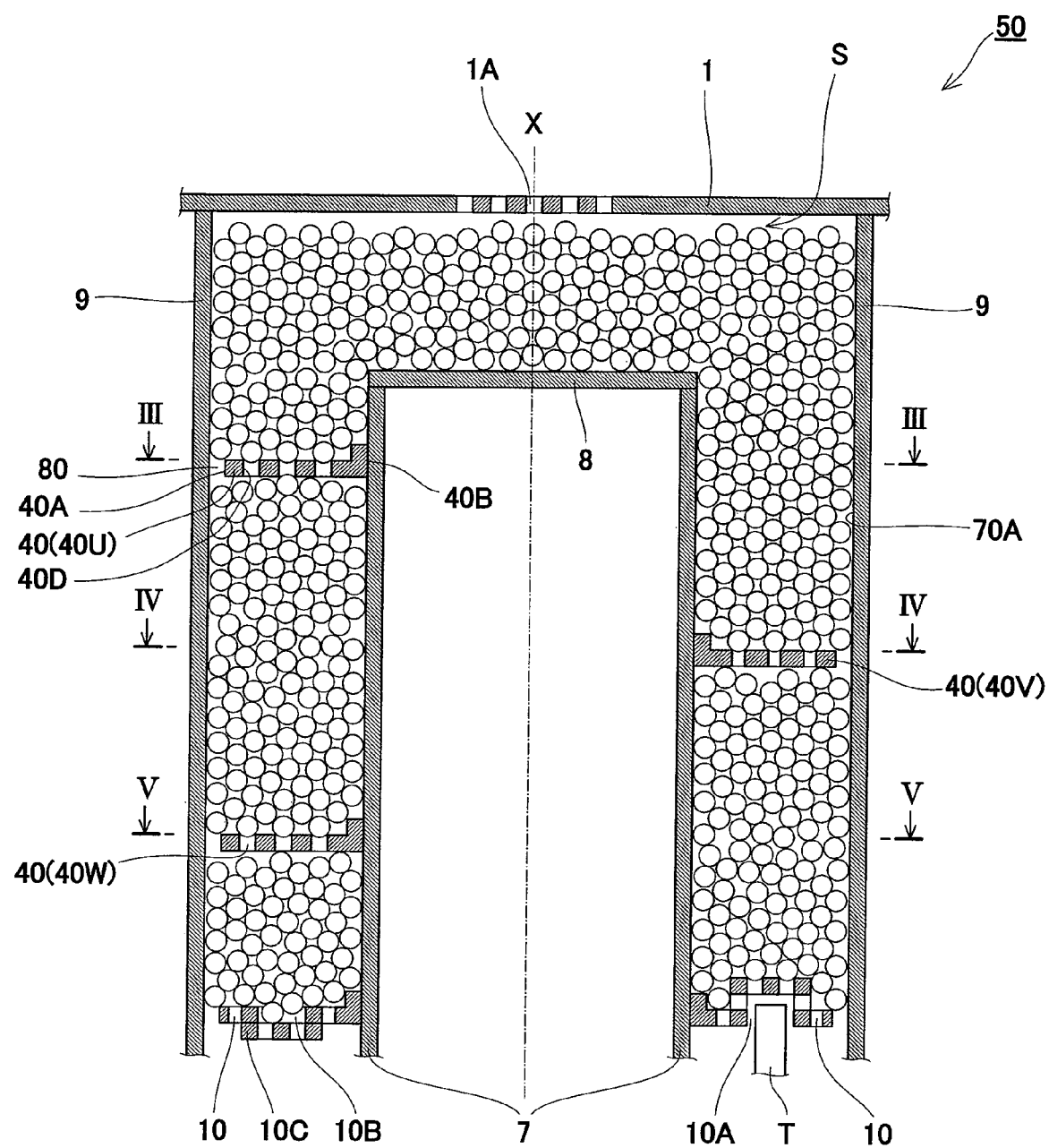
FIG. 2 is a longitudinal sectional view that schematically shows an inner structure of a catalyzing portion in the reformer body of FIG. 1.

FIG. 1 is a longitudinal sectional view that schematically shows one example of an inner structure of a reformer body of a hydrogen generator according to the embodiment of the present invention. FIG. 2 is a longitudinal sectional view that schematically shows an inner structure of a catalyzing portion in the reformer body of FIG. 1. It should be noted that the structure of a catalyzing portion 50 is omitted from FIG. 1.

As shown in FIG. 1, a reformer body 60 is a tubular body having a multitubular structure and a lid. Specifically, a plurality of cylindrical or polygonal tubular walls 3, 6, 7, 9, 11, and 13 are concentrically arranged around a center axis X, and the outer tube 3 located in an outermost circumference is closed at both end surfaces thereof by first and second outer lids 1 and 2.

The outer tube 3 is provided with a material feed hole 3A and a water supply hole 3B. Pipe members 31 and 32 are connected to the material feed hole 3A and the water supply hole 3B, respectively.

A tubular preheating portion 51 is defined by the outer tube 3, the preheating portion inner tube 13 and the first and second outer lids 1 and 2.

The first outer lid 1 is provided with a preheating portion outlet hole 1C at a position facing the preheating portion 51.

A connecting member 4 is disposed on an outer surface side of the preheating portion outlet hole 1C so as to cover the preheating portion outlet hole 1C.

The connecting member 4 is a duct-like member and disposed so as to connect the preheating portion outlet hole 1C to a catalyzing portion inlet hole 1A.

The catalyzing portion inlet hole 1A is formed in the first outer lid 1 so as to face a catalyst accommodating space 70 defined by the first outer lid 1, the catalyzing portion inner tube 7, a catalyzing portion inner tube lid 8, the catalyzing portion outer tube 9 and a catalyzing portion outer tube lid 10. Herein, the catalyzing portion inlet hole 1A is formed on the center axis X, that is, at the center of the first outer lid 1.

The catalyst accommodating space 70 has a bottomed tubular shape closed at an upper end thereof.

A member having a plurality of air holes such as a metal mesh is provided in the catalyzing portion inlet hole 1A, or alternatively, a plurality of air holes are formed in the first outer lid 1 itself to make the first outer lid 1 perforated. The catalyst accommodating space 70 is filled with particulate reforming catalyst P, thereby forming the catalyzing portion 50. As used herein, the term "particulate reforming catalyst" P refers to particles having a particular carrier that carries a catalyst species on its surface. The catalyst species generally contain, as a chief component, ruthenium (Ru), platinum (Pt), rhodium (Rh) or nickel (Ni). As the carrier, alumina, silica, ceramics, or like is used. The particulate reforming catalyst P has a shape of a sphere or a column having a diameter of about 3 to 5 mm.

The catalyzing portion outer tube lid 10 is formed by a perforated member having a plurality of air holes, such as a metal mesh. This ensures air permeability in the catalyzing portion inlet hole 1A and the catalyzing portion outer tube lid 10 while preventing leakage of the particulate reforming catalyst P.

Within the catalyzing portion inner tube 7, a combustor (combusting portion) 5 is provided on the second outer lid 2. The combustion heat generated in the combustor 5 is transferred to a radiation member 6 that is disposed inward of the catalyzing portion inner tube 7. The radiation heat of the radiation member 6 and the heat transferred from the combustion gas to the catalyzing portion inner tube 7 serve to heat the catalyzing portion inner tube 7. The catalyzing portion inner tube 7 heats the particulate reforming catalyst P that fills the catalyst accommodating space 70. Thus, the particulate reforming catalyst P is heated to a catalyst activation temperature with the heat generated by the combustor 5. Herein, the combustor 5 is disposed on the center axis X, that is, at the center of the second outer lid 2. The fuel for combustion is premixed with air and supplied from outside, i.e., from a pipe member 30 to a combustion fuel supply hole 2A formed in a center part of the second outer lid 2, and flows into the combustor 5.

Figure 3:
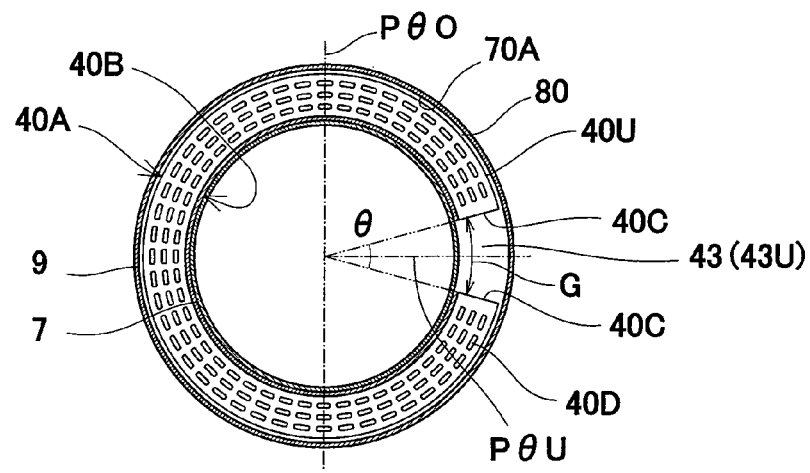
FIG. 3 is a cross-sectional view taken along line III-III of FIG. 2.
Figure 4:
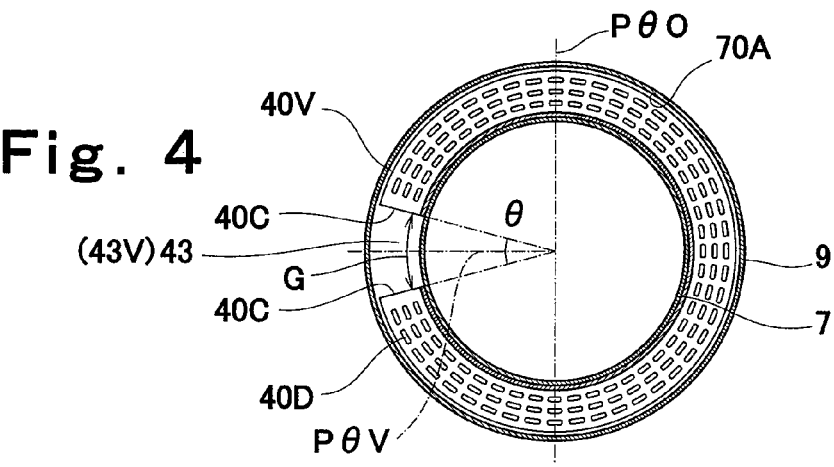
FIG. 4 is a cross-sectional view taken along line IV-IV of FIG. 2.
Figure 5:
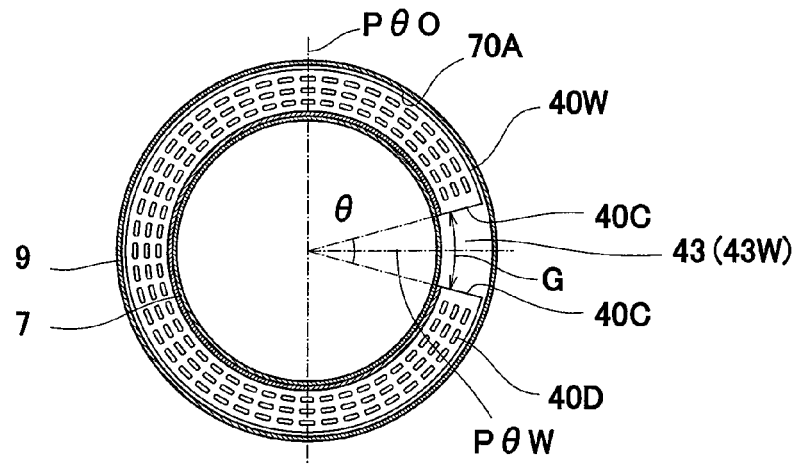
FIG. 5 is a cross-sectional view taken along line V-V of FIG. 2.

Next, the structure of the catalyzing portion 50, which is a main feature of the invention, will be described in detail. FIG. 3 is a cross-sectional view taken along line III-III of FIG. 2. FIG. 4 is a cross-sectional view taken along line IV-IV of FIG. 2. FIG. 5 is a cross-sectional view taken along line V-V of FIG. 2.

As shown in FIGS. 2 to 5, the catalyzing portion 50 of the present invention is defined by walls of the first outer lid 1, the catalyzing portion inner tube 7, the catalyzing portion inner tube lid 8, the catalyzing portion outer tube 9 and the catalyzing portion outer tube lid 10. The center axes of the catalyzing portion inner tube 7 and the catalyzing portion outer tube 9 coincide with the center axis X, and a tubular space 70A (main part of the catalyst accommodating space 70) having an annular cross-section is formed between these two tubes. Specifically, the catalyzing portion 50 extends in the direction in which the center axis X extends. Each separating member 40 is disposed on a cross-section of the tubular space 70A, i.e., a separating cross-section that is a cross section of the catalyzing portion 50 which is perpendicular to the direction in which the catalyzing portion 50 extends. A plurality of plate-like separating members 40, herein, three separating members 40U, 40V and 40W, are arranged in parallel to extend in a direction substantially perpendicular to the center axis X.

Herein, the planar shape of the separating members 40 is substantially C-shaped. To be specific, each separating member 40 is substantially C-shaped in a plan view, so as to have an inner peripheral edge 40A, an outer peripheral edge 40B and an arcuate gap G. The inner peripheral edge 40A is joined to an outer peripheral surface of the catalyzing portion inner tube 7 that is the inner one of the double tubes. The gap G forms an opening 43 on each separating cross-section of the tubular space 70A. More specifically, the planar shape of each separating member 40 is defined by the outer peripheral edge 40A, the inner peripheral edge 40B and a pair of linear ends 40C connecting ends of the outer peripheral edge 40A and the inner peripheral edge 40B each other. The outer and inner peripheral edges 40A and 40B are a pair of circular arcs centered on the center axis X and having a common center angle. The arcuate gap G is defined by the pair of linear ends 40C. The shape of the opening 43 is such that the center angle $\theta$ (the angle formed between the pair of ends 40C) of the arcuate gap G is about 30 degrees.

The openings 43 of adjacent separating members 40 are located on opposite sides in a plan view. That is, the openings 43 are deviated from each other between the adjacent separating members 40 by approximately 180 degrees in terms of the angular position with respect to the center of the tubular space 70A.

The separating members 40 each has a plurality of air holes 40D for preventing the passage of the particulate reforming catalyst P. For instance, in cases where the air holes 40D have a circular shape, the diameter of the air holes 40D may have any values less than a minimum outer dimension of the particulate reforming catalyst P. The shape of the air holes 40D may be different from the cross-sectional shape of the particulate reforming catalyst P. For instance, if the air holes 40D are circular whereas the particulate reforming catalyst P is spherical, the air holes 40D will in some cases be clogged with the particulate reforming catalyst P. In such cases, therefore, the air holes 40D should be elliptical, polygonal or the like. In this embodiment, the air holes 40D are in the shape of a rectangle of a long side of 3 mm and a short side of 1 mm, since the particulate reforming catalyst P is in the form of a sphere having a diameter of approximately 3 mm. Thereby, the air holes 40D can be prevented from being clogged with the particulate reforming catalyst P, so that the flow of the reforming reaction gas can be ensured.

Formed outside the catalyzing portion 50 is a reformed gas passage 81 that is formed by a tubular space defined by the catalyzing portion outer tube 9, the reformed gas separating tube 11, the first outer lid 1 and a reformed gas separating lid 12. A reformed gas discharge hole 1B, which is connected to the reformed gas passage 81, is formed in the first outer lid 1. A pipe member 33 is coupled to the reformed gas discharge hole 1B.

Formed between the reformed gas passage 81 and the preheating portion 51 is a second combustion gas passage 82 that is a tubular space defined by the reformed gas separating tube 11, the preheating portion inner tube 13, and the first and second outer lids 1 and 2.

Furthermore, a duct-like connecting member 14 is disposed and a third combustion gas passage 83 is formed, between a first combustion gas discharge hole 13A formed in the preheating portion inner tube 13 and a second combustion gas discharge hole 3C formed in the outer tube 3.

Next, the operation performed within the reformer body 60 when the hydrogen generator is operating will be described.

Material is supplied from outside to the material feed hole 3A via a pipe member 31, while water is supplied from outside to the water supply hole 3B via a pipe member 32.

The material and water thus supplied flow into the preheating portion 51. In the preheating portion 51, the material and the water are preheated with the heat of the combustion gas transferred from the preheating portion inner tube 13. In cases where either the material or the water is in liquid form, the material or the water will be vaporized into a material containing steam. The steam-containing material is guided to the catalyzing portion inlet hole 1A, from the preheating portion outlet hole 1C provided in the first outer lid 1, through the connecting member 4.

The steam-containing material is supplied from the catalyzing portion inlet hole 1A to the catalyzing portion 50 and flows toward the catalyzing portion outer tube lid 10 in the direction in which the catalyzing portion 50 extends. Then, the steam-containing material is reformed by the particulate reforming catalyst P and the heat of the combustion gas in the catalyzing portion 50, thereby producing a reformed gas mainly composed of hydrogen.

The reformed gas flows through the catalyzing portion outer tube lid 10, then flows into the reformed gas passage 81, and is then discharged from the reformed gas discharge hole 1B to the pipe member 33.

The combustion gas flows from an end portion of the radiation member 6, along the catalyzing portion inner tube 7 and the reformed gas separating tube 12, and into the second combustion gas passage 82. The heat of the combustion gas is used for preheating the material and the water through the preheating portion inner tube 13. The combustion gas flows into the second combustion gas passage 82 and is then discharged from the second combustion gas discharge hole 3C formed in the outer tube 3 to the outside, more particularly, to a pipe member 34 in this embodiment.

Next, the thermal deformation of the catalyzing portion 40 during startup operation and shutdown operation of the hydrogen generator will be described. During the startup operation, the surface temperature of the catalyzing portion inner tube 7 rises to 800° C. or higher. However, the catalyzing portion outer tube 9 rises in temperature more slowly in the catalyzing portion inner tube 7 and therefore large temperature difference occurs between them. That is, the expansion of the catalyzing portion inner tube 7 in its radial direction becomes greater than that of the catalyzing portion outer tube 9, so that the space filled with the particulate reforming catalyst P, i.e., the space formed between the catalyzing portion inner tube 7 and the catalyzing portion outer tube 9 is narrowed. Thereby, a compressive stress is applied to the particulate reforming catalyst P, which is partly crushed. On the other hand, during the shutdown operation, the surface temperature of the catalyzing portion outer tube 9 decreases more slowly than that of the catalyzing portion inner tube 7, causing large temperature difference between them. That is, the shrinkage of the catalyzing portion inner tube 7 in its radial direction is greater than that of the catalyzing portion outer tube 9, so that the space filled with the particulate reforming catalyst P, i.e., the space formed between the catalyzing portion inner tube 7 and the catalyzing portion outer tube 9 is increased. Thereby, the broken pieces of the particulate reforming catalyst P generated by crush are pushed to the downstream side in the direction in which the catalyzing portion 50 extends and accumulated in the vicinity of the separating members 40. As used herein, the term "reforming reaction gas" is a collective term of steam-containing materials and reformed gases and means a gas flowing in the catalyzing portion 50.

Even in cases where an operation history of the hydrogen generator becomes prolonged and many of the air holes 40D provided in the separating members 40 are clogged with the broken pieces of the particulate reforming catalyst P within the catalyzing portion 50 of the present invention, the passage for the reforming reaction gas can be ensured because of the openings 43. Therefore, the capability degradation of the hydrogen generator caused by the crush of the particulate reforming catalyst P can be suppressed.

If the particulate reforming catalyst P is crushed, the particulate reforming catalyst P continuously moves to the downstream side through the openings 43, because the catalyzing portion 50 is not completely separated by the separating members 40. Accordingly, generation of voids of the particulate reforming catalyst P does not substantially occur in the vicinities of the separating members 40. As a result, the decrease in reforming efficiency due to the decrease in heat transfer efficiency within the catalyzing portion 50 can be suppressed.

In addition, there is no need to increase the amount of heat to be generated in a burner 105 because the efficiency of heat transfer does not substantially decreases. As a result, the catalyst layer 103 located in the vicinity of the burner 105 is not heated to high temperature and therefore the degradation in service life of the particulate reforming catalyst P and a rise in the carbon monoxide concentration of reformed gas 110 can be suppressed, enabling stable operation of the fuel cell system.

The inner peripheral edge 40B of each separating member 40 is joined to the outer peripheral surface of the catalyzing portion inner tube 7 by welding. This makes it possible to transfer the heat from the catalyzing portion inner tube 7 to the separating members 40, thereby facilitating heating the particulate reforming catalyst P. That is, the separating members 40 also serve as heat transfer fins.

In cases where the thermal deformation occurs, the spacing between the catalyzing portion inner tube 7 and the catalyzing portion outer tube 9 is regulated by the separating members 40. As a result, the crush of the particulate reforming catalyst P can be reduced.

A gap 80 between the outer peripheral edge 40A of each separating member 40 and the catalyzing portion outer tube 9 is set smaller than the outer dimension of the particulate reforming catalyst P. This makes it possible to prevent the particulate reforming catalyst P from getting stuck in the gap 80 between the outer peripheral edge 40A and the catalyzing portion outer tube 9. As a result, the crush of the particulate reforming catalyst P can be reduced.

As described above, the separating members 40 are substantially C-shaped, the inner peripheral edge 40A of each separating member 40 is joined to the outer peripheral surface of the catalyzing portion inner tube 7 which is the inner one of the double tubes, and the opening 43 on each separating cross-section in the tubular space 70A is formed by the gap G. Therefore, the separating members 40 can be easily manufactured without involving an opening formation process. In addition, since the separating members 40 have an annular shape, a part of which is cut by the gap G, the fitting operation of the separating members 40 into the catalyzing portion inner tube 7 can be facilitated.

The openings 43 of the adjacent separating members 40 are located on opposite sides in a plan view. That is, the openings 43 are deviated from each other by approximately 180 degrees in terms of the angular position with respect to the center of the tubular space 70A. In FIGS. 3 to 5, angle P θ 0 indicates a reference angle position with respect to the center of the tubular space 70A. Angle positions P θ U, P θ V, and P θ W indicate angle positions of the openings 43U, 43V, and 43W respectively, with respect to the center of the tubular space 70A. As shown in FIGS. 3 to 5, the opening 43U of the first separating member 40U and the opening 43V of the second separating member 40V are positioned on opposite sides. Also, the opening 43V of the second separating member 40V and the opening 43W of the second separating member 40W are positioned on opposite sides. Therefore, in the tubular space 70A, a part of the reforming reaction gas, which has passed through the air holes 40D or opening 43U of the first separating member 40U, moves toward the opening 43V where a flow passage resistance is low, when moving through the second separating member 40V located on the downstream side of the first separating member 40U. Therefore, the reforming reaction gas flows in not only the extending direction but also circumferential direction of the catalyzing portion 50 within the tubular space 70A. The reforming reaction gas flowing from a region of the second separating member 40V to a region of the third separating member 40W behaves in a similar manner.

As should be appreciated from above, the separating members 40 are arranged in the catalyzing portion 50 of the present invention such that the openings 43 formed in the adjacent separating members 40 do not overlap each other when viewed in the direction in which the catalyzing portion 50 extends, i.e., the direction along the center axis X of the tubular space 70A. This arrangement makes flow passages for the reforming reaction gas dispersed in the catalyzing portion 50 and therefore can provide a uniform catalytic reaction distribution and a uniform temperature distribution within the catalyzing portion 50. As a result, the catalyzing portion 50 is able to exhibit high performance.

In the catalyzing portion 50 of the present invention, the openings 43 of the adjacent separating members 40 are positioned so as to form approximately 180 degrees as viewed in the direction along the center axis X of the tubular space 70A. With this arrangement, the flowing distance of the reforming reaction gas in the circumferential direction of the tubular space 70A between the adjacent separating members 40 can be maximized. As a result, the catalyzing portion 50 is able to exhibit higher performance.

In the catalyzing portion 50, areas where the catalytic reaction occurs largely differ in temperature from areas where the catalytic reaction does not occur. Uneven flow of the reforming reaction gas in the catalyzing portion 50 also causes a temperature distribution. The temperature of the catalyzing portion 50 is suitably controlled to be equal to an activation temperature of the particulate reforming catalyst P, for example, 500° C. to 700° C. Therefore, the temperature of the catalyzing portion 50 needs to be accurately measured and controlled so that the hydrogen generator exhibits its performance. As shown in FIGS. 2 and 5, a temperature detector T is disposed in the vicinity of the catalyzing portion outer tube lid (wall body) 10 that corresponds to a bottom portion of the catalyzing portion 50 which is located on the downstream side of the opening 43W formed on the separating cross-section where the most-downstream separating member 40, i.e., the third separating member 40W, is positioned. In this embodiment, a thermocouple is used as the temperature detector T. A concave portion 10A is formed in the catalyzing portion outer tube lid 10 and a tip end of the thermocouple is disposed in the concave portion 10A. Since the reformed gas having a uniform catalytic reaction distribution and uniform temperature distribution flows in the most-downstream opening 43W, a suitable temperature can be detected as a representative temperature of the catalyzing portion 50 by providing the temperature detector T.

In this embodiment, the temperature detector T is disposed so as to overlap the most-downstream opening 43W, when viewed in the direction in which the catalyzing portion 50 extends. More specifically, as illustrated in FIGS. 2 and 5, the tip end of the thermocouple is positioned within the concave portion 10A of the catalyzing portion outer tube lid 10 which overlaps the opening 43W as viewed in the direction in which the catalyzing portion 50 extends. Thereby, the temperature of the gas sent from the most-downstream opening 43W can be more accurately detected. As a result, a more suitable temperature can be detected as the representative temperature of the catalyzing portion 50.

Furthermore, as shown in FIG. 2, the catalyzing portion outer tube lid 10 is provided with a catalyst filling hole 10B through which the particulate reforming catalyst P is allowed to pass through. When manufacturing the reformer body of the hydrogen generator of the present invention, the particulate reforming catalyst P is introduced from the catalyst filling hole 10B and sent to the whole area of the catalyzing portion 50 through the openings 43. In this way, the filling operation of the particulate reforming catalyst P can be carried out by introducing the particulate reforming catalyst P from one location which is the catalyst filling hole 10B. Therefore, the filling operation can be easily performed in the present invention, compared to the hydrogen generator disclosed in patent document 1 in which the particulate reforming catalyst P needs to be introduced from a plurality of filling holes.

After the filling operation of the particulate reforming catalyst P, a closing plate 10C is joined to the catalyst filling hole 10B by welding, thereby closing the catalyst filling hole 10B. This makes it possible to minimize the welding process performed subsequently to the filling operation of the particulate reforming catalyst P and therefore to minimize the influence of heat caused by welding on the particulate reforming catalyst P.

Next, two alternative examples of the separating members 40 will be described.

Alternative Example 1

Figure 6:
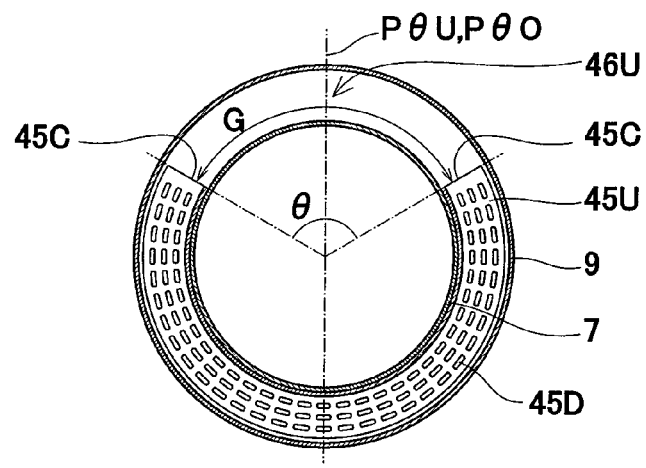
FIG. 6 is a view showing an example of a separating member shown in FIG. 3, according to alternative example 1.
Figure 7:
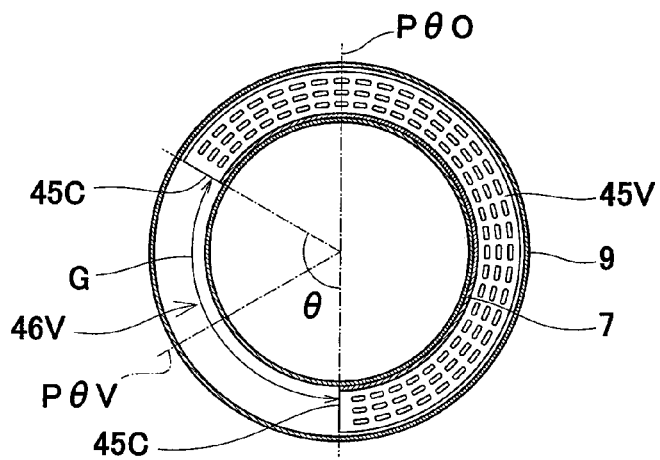
FIG. 7 is a view showing an example of a separating member shown in FIG. 4, according to alternative example 1.
Figure 8:
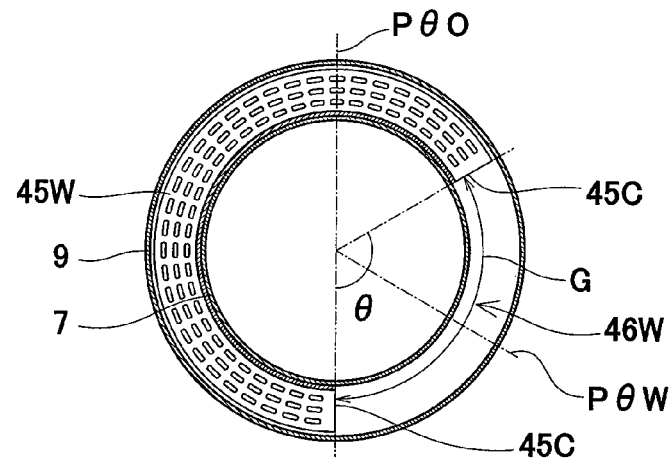
FIG. 8 is a view showing an example of a separating member shown in FIG. 5, according to alternative example 1.

FIG. 6 is a view showing an example of the separating member 40U shown in FIG. 3, according to alternative example 1. FIG. 7 is a view showing an example of the separating member 40V of FIG. 4, according to alternative example 1. FIG. 8 is a view showing an example of the separating member 40W of FIG. 5, according to alternative example 1.

As shown in the drawings, three separating members 45 (45U, 45V, 45W) of the alternative examples are such that the separating members 40 shown in FIGS. 3 to 5 are altered in terms of the center angle θ and location of the gap G.

Specifically, the center angle θ of the gaps G of the separating members 45 is 120 degrees. The gaps G of the adjacent separating members 45 are so arranged that they do not substantially overlap each other as viewed in a direction along the center axis X of the tubular space 70A. More specifically, the angle position P θ V of an opening 46V formed in the second separating member 45V is displaced from the angle position P θ U of an opening 46U formed in the first separating member 45U by 120 degrees, while the angle position P θ W of an opening 46W formed in the third separating member 45W is displaced from the angle positions P θ U and P θ V of the openings 46U and 46V by 120 degrees.

Alternative Example 2

Figure 9:
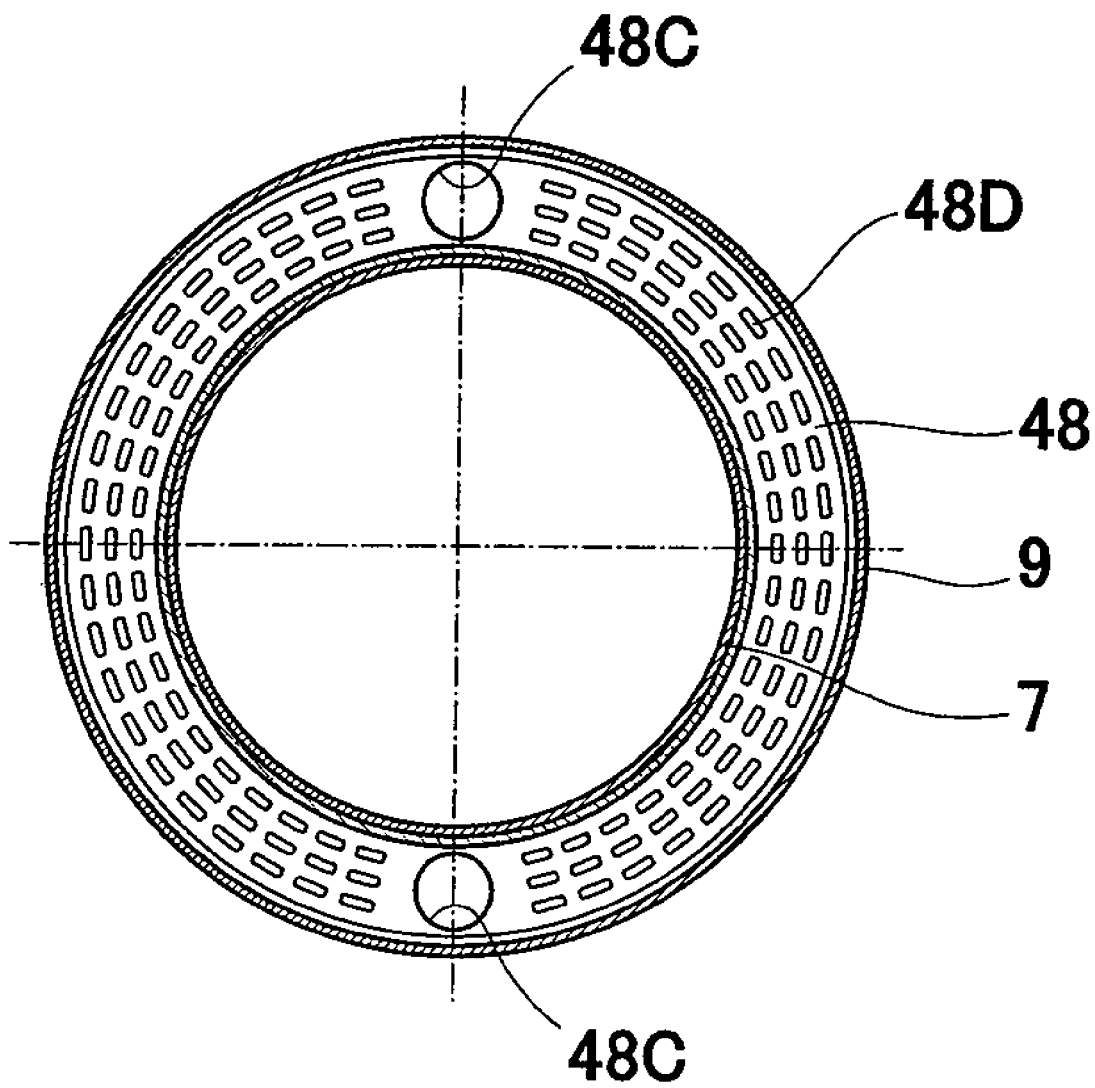
FIG. 9 is a view showing an example of a separating member shown in FIG. 3, according to alternative example 2.

FIG. 9 is a view showing an example of the separating members 40 of FIG. 3, according to alternative example 2.

As shown in FIG. 9, a separating member 48 according to alternative example 2 is altered such that it has an annular shape with no ends and two through holes (openings) 48C. That is, openings are formed in the separating member 48 itself. The through holes 48C are shaped to allow the particulate reforming catalyst P to pass therethrough.

The separating member 48 is provided with a plurality of air holes 48D similar to the air holes 40D and 45D of the separating members 40 and 45.

Alternative Example 3

Figure 10:
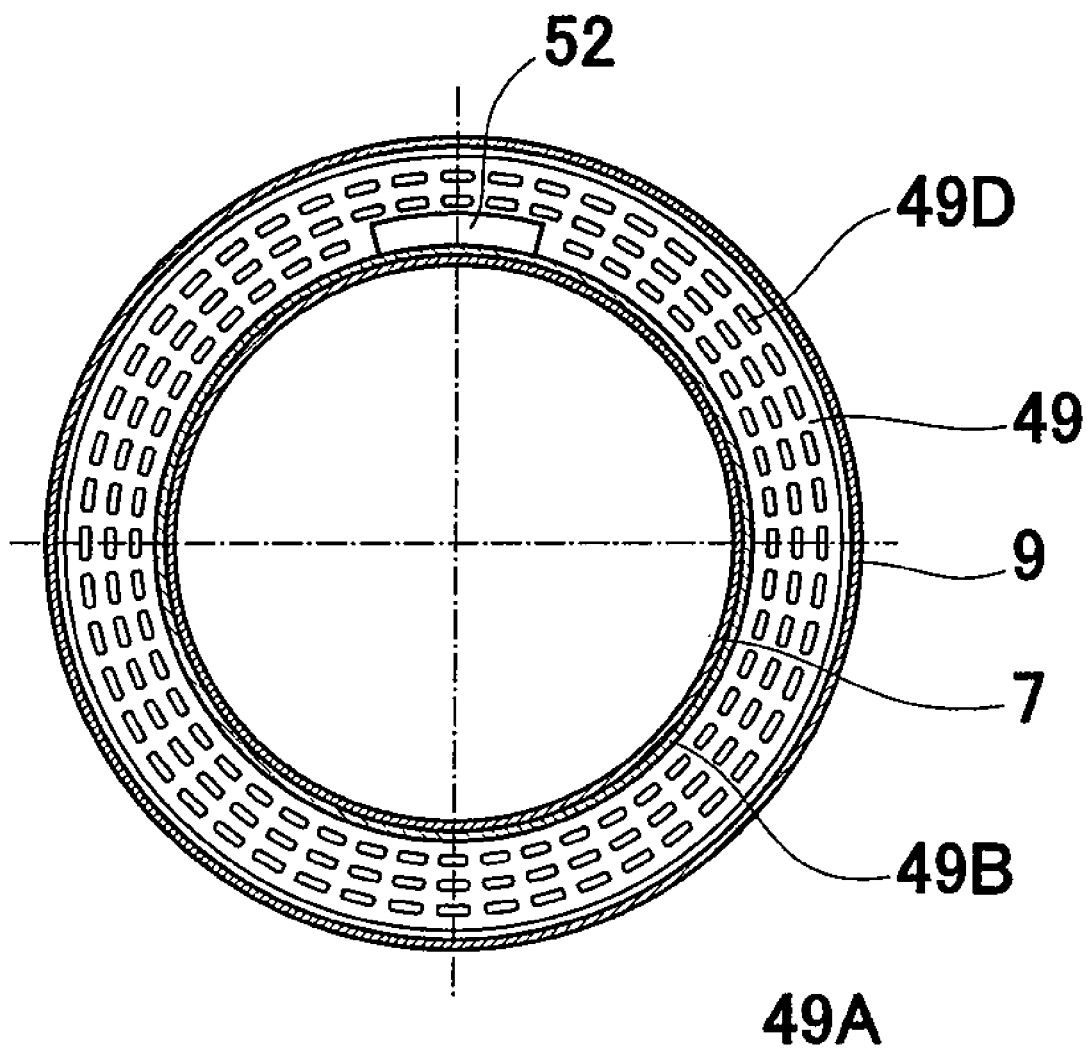
FIG. 10 is a view showing an example of a separating members shown in FIG. 3, according to alternative example 3.
Figure 11:
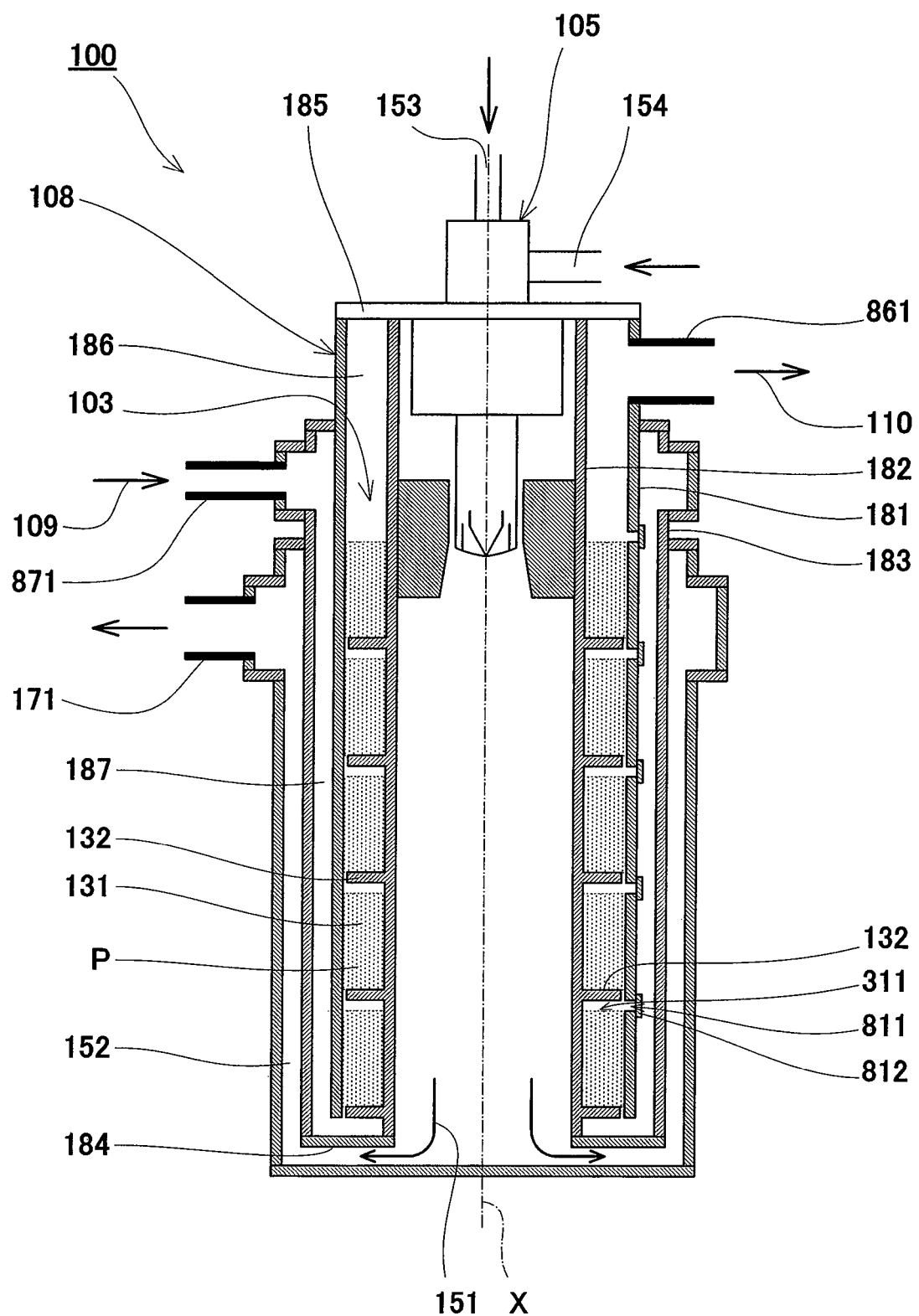
FIG. 11 is a longitudinal sectional view of a fuel reformer shown in example 3 of patent document 1.

FIG. 10 is a view showing an example of the separating member 40 of FIG. 3, according to alternative example 3.

As shown in FIG. 10, a separating member 49 according to the alternative example 3 is altered such that the inner peripheral edge 49B is partly cut away to form an opening 52. Whereas the opening 52 is formed by cutting away a part of the inner peripheral edge 49B, it may be formed by cutting away a part of the outer peripheral edge 49A. The opening 52 is shaped to allow the particulate reforming catalyst P to pass therethrough.

The separating member 49 is provided with a plurality of air holes 49D similar to the air holes 40D, 45D and 48D of the separating members 40, 45 and 48.

In cases where any of the above-described separating members 45, 48 and 49 is used, in the hydrogen generator of the present invention, neither clogging of the reforming reaction gas flow passage nor generation of voids of the particulate reforming catalyst P is caused by the crush of the particulate reforming catalyst P in the catalyzing portion 50. As a result, it becomes possible to suppress the degradation in capability of the hydrogen generator which is caused by the crush of the particulate reforming catalyst P and the decrease in reforming efficiency due to the decrease in heat transfer efficiency in the catalyzing portion 50 which is caused by the crush of the particulate reforming catalyst.

Although the catalyzing portion inner tube 7, the catalyzing portion outer tube 9 and the tubular space 70A (catalyst accommodating space 70) are in cylindrical form in the above embodiment, the shapes of these are not intended to be limited to this but may be other forms so long as a flow passage having an inlet and an outlet for the reforming reaction gas is formed. Examples of the shape may be polygonal tubular, cylindrical column, polygonal column, or bent pipe.

The planar shapes of the separating members 40 and 45 and their gaps G, the planar shapes of the separating members 48 and their through holes (openings) 48C, and the planer shapes of the separating members 49 and their openings 52 are not intended to be limited to those described in the foregoing embodiments but may take any forms corresponding to the cross-sectional shape of the tubular space 70A.

Since the use of at least one separating member 40, 45, 48, or 49 makes it possible to reduce the thermal deformation of the catalyzing portion 50 during the startup operation and the shutdown operation and the accumulation of the broken pieces of the particulate reforming catalyst P on the catalyzing portion outer tube lid 10, the number of the separating members 40, 45, 48 or 49 may be at least one.

The number of separating members 40, 45, 48 or 49 and the shapes of the separating members 40, 45, 48 or 49 can be suitably determined depending on the operating conditions of the hydrogen generator such as the frequency of startup and shutdown of the hydrogen generator.

In addition, the separating members 40, 45, 48 and 49 having different shapes may be arranged in parallel.

Furthermore, the use of at least one opening 43, 46, or 49, and the through hole (opening) 48C makes it possible to prevent clogging of the reforming reaction gas flow passage which is caused by the crush of the particulate reforming catalyst P and to prevent generation of voids of the particulate reforming catalyst P which is caused by the crush of the particulate reforming catalyst P. As a result, the degradation in capability of the hydrogen generator and the decrease in reforming efficiency due to the decrease in heat transfer efficiency in the catalyzing portion 50 can be suppressed. Therefore, the number of openings 43,46, or 49 and through holes (opening) 48C may be at least one.

In addition, the number of openings 43 46, or 49, or through holes (opening) 48C and the shapes of the openings 43, 46 and, 49 and the through holes (opening) 48C can be suitably determined depending on the operating conditions of the hydrogen generator such as the frequency of startup and shutdown of the hydrogen generator.

Further, the openings 43, 46 and 49 and through holes (openings) 48C having different shapes may be present on the same separating cross-section.

In cases where the separating members 45, 48 or 49 are used, in the same manner, neither clogging of the reforming reaction gas flow passage nor generation of voids of the particulate reforming catalyst P is caused by the crush of the particulate reforming catalyst P in the catalyzing portion 50. Therefore, it becomes possible to suppress the degradation in capability of the hydrogen generator which is caused by the crush of the particulate reforming catalyst P and the decrease in reforming efficiency due to the decrease in heat transfer efficiency in the catalyzing portion 50 which is caused by the crush of the particulate reforming catalyst P in the hydrogen generator of the present invention.

Whereas the preferred embodiment has been described so far, the present invention is not limited to the above described embodiment. Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

For instance, the planar shapes of the separating members 40 and 45 and their gaps G and the planar shapes of the separating members 48 and their through holes (openings) 48C are not intended to be limited to the above embodiments but may be varied to correspond to a cross-sectional shape of the tubular space 70A.

Since the use of at least one separating member 40, 45 or 48 makes it possible to reduce the thermal deformation of the catalyzing portion 50 during the startup operation and the shutdown operation and the accumulation of the broken pieces of the particulate reforming catalyst P on the catalyzing portion outer tube lid 10, the number of separating members 40, 45, or 48 may be at least one.

The number of separating members 40, 45 or 48 and the shapes of the separating members 40, 45, or 48 can be suitably determined depending on the operating conditions of the hydrogen generator such as the frequency of startup and shutdown of the hydrogen generator.

In addition, the separating members 40, 45 and 48 having different shapes may be arranged in parallel.

Generally, in a fuel cell system including a hydrogen generator and a fuel cell, a reformed gas generated in the hydrogen generator is supplied as a material to the fuel cell. Therefore, in a fuel cell system including the hydrogen generator of the present invention and a fuel cell, neither clogging of the reforming reaction gas flow passage nor generation of voids of the particulate reforming catalyst P is caused by the crush of the particulate reforming catalyst P in the catalyzing portion 50. As a result, it becomes possible to suppress the degradation in capability of the fuel cell system which is caused by the crush of the particulate reforming catalyst P and the decrease in reforming efficiency due to the decrease in heat transfer efficiency in the catalyzing portion 50 which is caused by the crush of the particulate reforming catalyst P.

INDUSTRIAL APPLICABILITY

The hydrogen generator of the present invention is useful because it can suppress the deterioration in capability of the hydrogen generator which is caused by the crush of the particulate reforming catalyst and the decrease in reforming efficiency due to the decrease in heat transfer efficiency in the catalyzing portion which is caused by the crush of the particulate reforming catalyst.

The invention claimed is:

1. A hydrogen generator comprising:
   a catalyzing portion having particulate reforming catalyst; and
   a combusting portion for heating said catalyzing portion, said hydrogen generator being configured to generate a reformed gas containing hydrogen while flowing a material gas containing steam in a direction in which said catalyzing portion extends;
   wherein said catalyzing portion includes a separating member,
   wherein said separating member is disposed on a separating cross-section which is a cross-section of said catalyzing portion in a direction perpendicular to the direction in which said catalyzing portion extends,
   wherein a plurality of air holes having a shape to inhibit passage of the particulate reforming catalyst are provided on said separating member,
   wherein an opening having a shape to permit passage of the particulate reforming catalyst is provided on the separating cross-section,
   wherein a plurality of separating members are arranged in parallel in the direction in which said catalyzing portion extends,
   wherein said plurality of separating members are disposed in such a manner that openings provided on adjacent separating cross-sections of at least a part of said plurality of separating members do not overlap each other as viewed from the direction in which said catalyzing portion extends, and
   wherein said plurality of separating members are disposed in such a manner that openings provided on adjacent separating cross-sections of at least a part of said plurality of separating members are angularly offset from each other relative to a central axis of the catalyzing portion parallel to the direction in which the catalyzing portion extends.

2. The hydrogen generator according to claim 1, wherein said plurality of separating members are disposed in such a manner that openings provided on adjacent separating cross-sections of all of said plurality of separating members do not overlap each other as viewed from the direction in which said catalyzing portion extends.

3. The hydrogen generator according to claim 1, wherein said plurality of separating members are disposed in such a manner that openings provided on adjacent separating cross-sections form an angle of approximately 180 degrees as viewed from the direction in which said catalyzing portion extends.

4. The hydrogen generator according to claim 1, comprising:

double tubes;

wherein at least a part of said catalyzing portion is formed in a space between the double tubes;

and wherein said separating member is disposed in the space between said double tubes in such a manner that said separating member is joined to an outer peripheral surface of an inner tube of said double tubes, and said combusting portion is configured to heat the inner tube from inner side of the inner tube.

5. The hydrogen generator according to claim 1, wherein said separating member is substantially C-shaped in a plan view to have an inner peripheral edge and an outer peripheral edge and to have an arcuate gap;

and wherein said opening is formed in the gap.

6. A fuel cell system comprising:

the hydrogen generator according to claim 1; and a fuel cell which is supplied with the reformed gas as a material from said hydrogen generator.

\* \* \* \* \*